United States Patent [19]

Williams, Jr.

[11] Patent Number: 4,572,731
[45] Date of Patent: Feb. 25, 1986

[54] PINCH MEANS FOR ATTENUATING FLOAT GLASS AND METHOD OF USING SAME

[75] Inventor: O. Franklin Williams, Jr., Meadville, Pa.

[73] Assignee: PPG Industries, Inc., Pitsburgh, Pa.

[21] Appl. No.: 685,427

[22] Filed: Dec. 24, 1984

[51] Int. Cl.4 .............................................. C03B 18/06
[52] U.S. Cl. ........................................ 65/99.5; 65/91; 65/182.4
[58] Field of Search ........................ 65/91, 99.5, 182.4

[56] References Cited

U.S. PATENT DOCUMENTS

| 3,326,651 | 6/1967 | Javaux | 65/99.5 X |
| 3,373,008 | 3/1968 | Lawrenson et al. | 65/182.4 |
| 3,632,323 | 1/1972 | Robinson et al. | 65/99.5 X |
| 3,929,444 | 12/1975 | May et al. | 65/182.4 |
| 4,300,938 | 11/1981 | May | 65/182.4 |
| 4,305,745 | 12/1981 | Mouly | 65/99.5 |

FOREIGN PATENT DOCUMENTS 2057421  4/1981  United Kingdom ................ 65/99.5

Primary Examiner—Robert Lindsay
Attorney, Agent, or Firm—Dennis G. Millman

[57] ABSTRACT

In a float glass process, traction of an attenuating device on the glass ribbon is enhanced by a member buoyantly engaging the underside of the ribbon.

16 Claims, 3 Drawing Figures

PINCH MEANS FOR ATTENUATING FLOAT GLASS AND METHOD OF USING SAME

BACKGROUND OF THE INVENTION

This invention relates to the float process for making flat glass whereby a stream of molten glass is fed onto a pool of molten metal (usually tin). While the glass is floating on the molten metal in a softened condition, forces are applied to stretch the ribbon of glass to the desired thickness. Part of these forces are conventionally applied by means of rolls that extend through the sidewalls of the float forming chamber and engage marginal edge portions of the glass ribbon. These side engaging means serve to prevent the ribbon from unduly losing width as it is being longitudinally stretched, or in some cases they may be used to laterally stretch the ribbon. In the most common practice, the attenuating rolls engage only the top surface of the ribbon. Traction between the attenuating roll and the glass ribbon is limited by the buoyant force of the molten metal on the glass ribbon. Traction can be enhanced by providing knurled or toothed glass engaging surfaces on the periphery of the attenuating rolls, but in some cases the traction attainable is not as great as would be desired, particularly when attempting to attenuate the ribbon after it has cooled substantially (e.g. below about 1500° F., 820° C.).

In the past it was also known to grip marginal edge portions of a glass ribbon in a float bath between upper and lower driven rolls, the lower roll being submerged in the molten metal. Such an arrangement would be capable of considerable traction, but that type of attenuating device has been found to be difficult to manipulate and also presents a difficulty in maintaining a fixed gap between the top and bottom rolls because of the potential for eccentricity of the roll shafts in the hot environment of the float forming chamber. Cooling the roll that is immersed in the molten metal has the drawback of a strong cooling effect on the adjacent molten metal. An attempt to overcome this problem is shown in U.S. Pat No. 3,373,008 (Lawrenson et al.) in which the lower roll is isolated from the molten metal by a protective slipper. Such an arrangement, however, is even more cumbersome and disadvantageously entails contact between the glass ribbon and the slipper member, whereby the marginal edge portion of the glass is significantly displaced. Deformation of the glass ribbon would be particularly undesirable when attenuating the ribbon after its viscosity has increased substantially in the cooler regions of the float forming chamber.

SUMMARY OF THE INVENTION

In the present invention the grip of an attenuating device contacting the top surface of a glass ribbon in a float forming chamber is enhanced by means of a solid member on the underside of the glass ribbon in approximate vertical alignment with the top roll, wherein the bottom member is buoyantly engaged against the underside of the ribbon. The buoyant force of the bottom member permits greater downward force to be exerted by the attenuating device engaging the top surface of the glass ribbon. The resulting improvement in the tractive force that may be applied to the glass ribbon is useful at any of the locations where attenuating forces are applied to the glass ribbon in the float forming chamber, but it is particularly useful in regions where the glass has cooled and stiffened to the point where attenuation has heretofore been considered difficult due to insufficient traction of attenuating devices on the glass ribbon. For a conventional soda-lime-silica flat glass composition, attenuation has been considered difficult when the glass temperature falls below 1500° F. (820° C.), but the present invention enables attenuation to be affectively carried out below that temperature. The traction developed by the attenuating devices of the present invention is sufficient to enable the ribbon to be widened in the relatively cool regions of the float forming chamber. This ability is particularly significant in the practice of the method disclosed in U.S. Pat. No. 4,305,745 (Mouly) wherein improved optical quality of glass is obtained by widening the ribbon subsequent to the major attenuation steps.

The member that is submerged in the molten metal and contacts the underside of the glass ribbon need not be driven, but is preferably mounted so as to be free to rotate so as to avoid frictional drag against the glass ribbon. In order to provide buoyant force against the underside of the glass ribbon, the submerged member may be fabricated of a material having a lower density than the molten metal, or it may be provided with cavities so as to yield the desired average density. The density difference between the member and the molten metal and the volume of displacement of the molten metal will determine the degree of buoyant force exerted on the underside of the glass ribbon. A preferred embodiment for maximizing the buoyant force entails a submerged member in the form of a horizontally extending disc whereby the relatively thin profile of the disc permits easy insertion under the glass ribbon and a relatively large radius results in substantial displacement of molten metal. The disc may be mounted so as to rotate freely about a substantially vertical axis. In other embodiments, the submerged member may be in the form of one or more cylinders having generally horizontally oriented axis of rotation. The disc or cylinder is preferably carried by the support structure for the top engaging attenuating device, but alternatively the bottom engaging members may be mounted onto the floor or sidewall structure of the float forming chamber. In either case, the member are mounted with freedom to move vertically so as to exert buoyant force against the underside of the ribbon. In order to provide extended life for the submerged member, it is preferred that it be fabricated of a material compatible with the molten metal. In the case of molten tin the metal most commonly used with float glass forming processes carbon is a preferred material because of its chemical compatibility with the molten tin and the glass, its high temperature durability in the non-oxidizing atmosphere maintained within a float forming chamber, and because of its buoyancy in molten tin.

Further understanding of the invention will be obtained from the drawings and the detailed description of preferred embodiments which follow.

THE DRAWINGS

DETAILED DESCRIPTION

Figure 1:
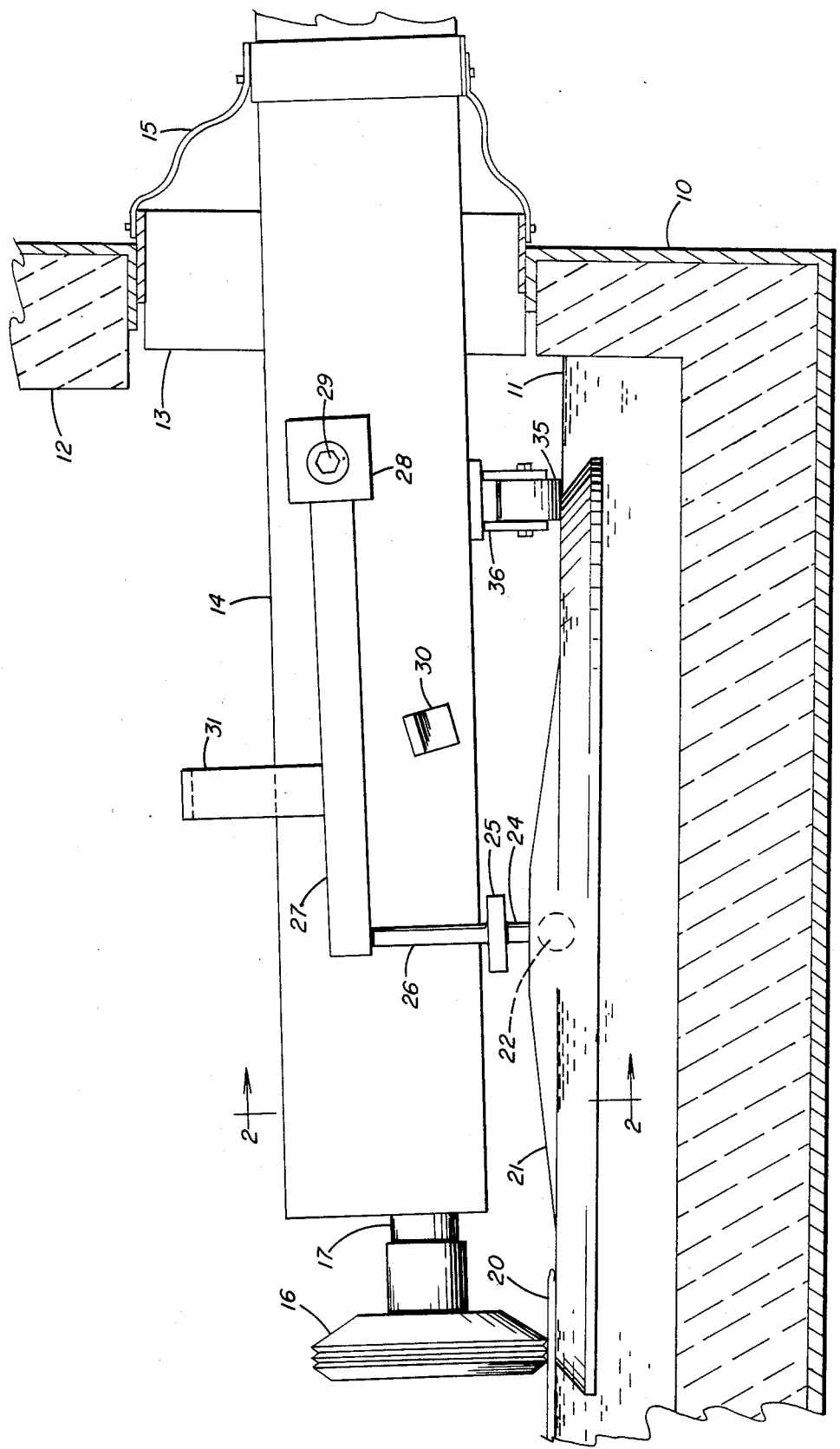
FIG. 1 is a vertical cross-section taken transversely across a side portion of a float glass forming chamber showing a conventional attenuating device carrying a preferred embodiment of a buoyant bottom surface engaging member in accordance with the present invention.
Figure 2:
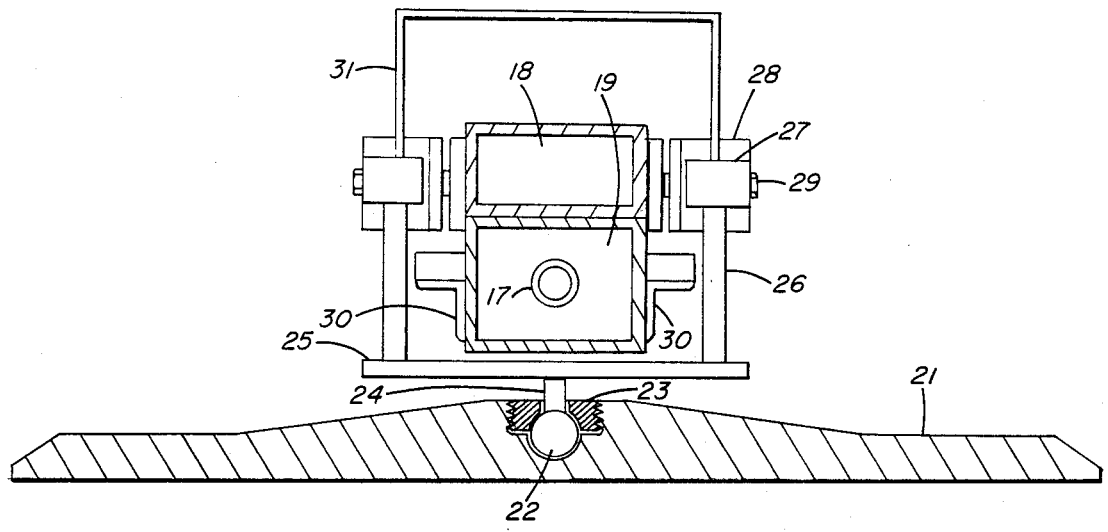
FIG. 2 is a vertical cross-section of the attenuating device taken along line 2—2 in FIG. 1.

For the purpose of illustrating the invention, the preferred mode, as depicted in FIGS. 1 and 2, will be described in detail herein, but it should be understood that other embodiments are contemplated within the scope of the principles of the invention. Referring now to FIG. 1, there is shown a side portion of a float glass forming chamber having a basin 10 containing a pool of molten metal 11 usually consisting essentially of molten tin. Sidewall member 12 is suspended above the side of the basin, and the space therebetween is filled with removable side seal members 13. At locations where attenuating devices are extended into the floating chamber, the side seal member 13 is adapted to accommodate an elongated support beam 14. The opening for the beam 14 is closed, and flexibility for adjusting the position of the beam is provided by a flexible boot member 15. The interior of the chamber is fully enclosed so as to maintain a non-oxidizing atmosphere consisting of nitrogen and sometimes a small amount of hydrogen to prevent oxidation of the molten tin.

At the end of the beam 14 there is carried the attenuating device for engaging the top surface of the glass ribbon 20, which in the embodiment shown is a roll 16 which may be provided with a plurality of rows of teeth about its periphery. Other configurations of attenuating rolls as are known in the art may be employed. Other known devices such as blades or gas jets may also be employed. The roll 16 is mounted on a rotating shaft 17 which extends along the length of the beam 14 to external drive means (not shown). As shown in FIG. 2, the interior of the beam 14 may be provided with coolant passages 18 and 19. Means to provide rotation to the shaft 17 and arrangements for adjustably supporting the beam 14 are known in the art, suitable examples of which may be seen in U.S. Pat. Nos. 3,929,444 (May et al.) and 4,300,938 (May), the disclosures of which are hereby incorporated by reference.

Bearing against the underside of the glass ribbon 20 is a carbon disc 21. The disc 21 is rotatably mounted on a ball 22 received in a central socket closed by a threaded socket cap 23 (FIG. 2). The ball 22 is affixed to a stem 24 which is, in turn, carried by a support structure. In the preferred embodiment shown in the drawings, a support structure consists of a pivotable arm mounted on the beam 14, thereby providing freedom for the disc 21 to buoyantly rise against the underside of the glass ribbon 20. Although not essential to the invention, the arm structure of the embodiment shown is a bifurcated arrangement straddling the beam 14. The ball 22 and stem 24 are carried on a cross member 25 joining a pair of vertical members 26 on opposite sides of the beam 14 which in turn are supported at the ends of the pair of horizontal members 27. Bearing blocks 28 at the opposite ends of the horizontal members 27 are affixed to the sides of the beam 14 by means of bolts 29 and permit the entire pivot arm assembly and the disc 21 carried thereby to pivot about a horizontal axis. A stop member 30 may be provided on each side of the beam 14 so as to engage the horizontal members 27 and prevent excessive downward pivoting of the pivot arm assembly when the attenuating apparatus is being manipulated into or out of position. A top strap 31 joining the two horizontal members 27 may also be provided to provide aditional rigidity to the pivot arm assembly.

Because of the ball and socket attachment of the disc 21 to the pivot arm assembly, the disc is free to pivot in all directions. Therefore, a bumper roll 35 may be provided to limit the upward movement of the outboard portion of the disc, thereby maintaining a larger portion of the disc submerged and leveraging the buoyant force of the disc to the Pinching action between the inboard portion of the disc 21 and the top attenuating roll 16. The bumper roll 35 may be rotatably carried on a clevis 36 so as to minimize friction between the bumper roll and the disc. The clevis 36 may, in turn, be affixed to the underside of the beam 14 as shown in FIG. 1. As shown in FIGS. 1 and 2, it is preferred to provide a raised portion on the top portion surface of the disc 21 to prevent molten metal from entering the ball and socket joint.

Figure 3:
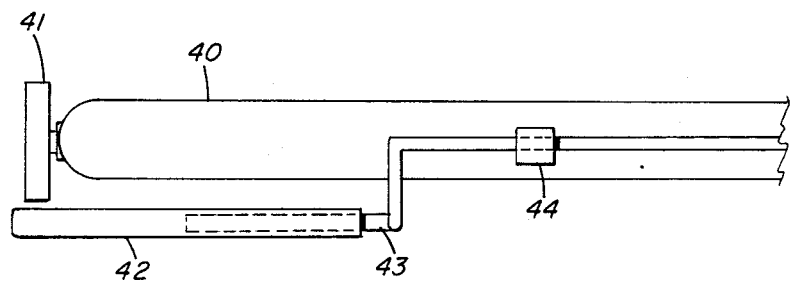
FIG. 3 is a side view of an attenuating device carrying an alternative embodiment of submerged bottom surface engaging means.

In FIG. 3 there is shown an alternative embodiment of the present invention, which, like the previous embodiment, includes a beam 40 carrying at its end a rotatably mounted attenuating roll 41 for engaging the top surface of the glass ribbon. Instead of a submerged disc, this embodiment employs a submerged cylinder 42 which may be fabricated of carbon or other material compatible with the molten metal. The cylinder 42 is provided with an internal bore at one end within which is received one end of a support rod 43. The cylinder 42 is free to rotate on the rod 43 so as to reduce drag on the glass ribbon when the cylinder contacts the underside of the glass ribbon in a region below the attenuating roll 41. The rod 43 is rotatably received in a sleeve 44 affixed to the beam 40 so that the cylinder 42 is free to pivot upwardly under the influence of its buoyant force against the underside of the glass ribbon. To prevent molten metal from coming into contact with the bore in the cylinder 42 and the lower portion of the rod 43, the cylinder may be inclined slightly from horizontal so that the bore is above the surface level of the molten metal in the float forming chamber. This inclined orientation may be provided by inclining the entire apparatus including beam 40, as is typically the case in operating conventional attenuating rolls.

In the embodiments described hereinabove, the submerged buoyant members have been supported on the structure of the upper attenuating device which is advantageous for mobility. However, it should be understood that the buoyant members may be independently mounted or may be mounted in a fixed position in the float chamber basin. Independent mounting may, for example, involve a submerged carbon tray on which is rotatably retained either the disc or cylinder configuration. The tray may be portable and may be weighted or otherwise temporarily restrained to maintain it in position. A permanent installation in the basin may be a accommodated by a recess in the refractory floor so as to provide additional clearance beneath the glass ribbon. In any of these additional examples, the buoyant member would be mounted so as to have freedom to move vertically into engagement with the underside of the glass ribbon.

When forming conventional soda-lime-silica flat glass by a float process, the molten glass is typically delivered onto the molten metal pool at a temperature of about 1900° F. (1040° C.) and as the ribbon progresses along the length of the float forming chamber, it cools until it attains a temperature at which it can be taken from the molten metal pool and supported by solid conveying means, usually at a temperature of about 1100° F. (600° C.). The viscosity of the glass ribbon is usually considered suitable for attenuation to thicknesses below the equilibrium thickness of the molten glass on the molten metal when the glass is in the temperature range of about 1500° F. (820° C.) to about 1800° F. (980° C.). However, it has been found that the attenuating means of the present invention provides sufficient traction to enable significant attenuation below 1500° F. (820° C.). The ability to maintain or increase the glass ribbon width in the region where its temperature is below 1500° F. (820° C.) is believed to have a positive affect on the applicable quality of the glass by improving the surface flatness thereof. The present invention has been found to permit lateral stretching of the glass in preferred cases below 1400° F. (760° C.) and sometimes even below 1300° F. (705° C.).

Other variations and modifications as are known to those of skill in the art may be resorted to without departing from the spirit and scope of the invention as defined by the claims which follow.

I claim:

1. Apparatus for forming flat glass comprising a chamber adapted to hold a pool of molten metal, means for delivering a stream of molten glass into the chamber so as to form a ribbon on the pool of molten metal, attenuating means for gripping marginal edge portions of the glass ribbon including an upper member tractably engaging the upper surface of the glass ribbon, and a lower member at least partially immersed in the molten metal and buoyantly urged against the underside of the ribbon in a region in substantial vertical alignment with the region of engagement of the upper member.

2. The apparatus of claim 1 wherein the lower member is comprised of carbon.

3. The apparatus of claim 2 wherein the lower member is a disc mounted with freedom to rotate about a substantially vertical axis.

4. The apparatus of claim 3 wherein the disc is mounted to a support by means of a ball and socket connection.

5. The apparatus of claim 2 wherein the member is a cylinder mounted with freedom to rotate about a substantially horizontal axis.

6. The apparatus of claim 1 wherein the upper member is a rotatably driven roll.

7. The apparatus of claim 1 wherein the lower member is pivotably connected to support means for the upper member.

8. The apparatus of claim 7 wherein the pivoting connection of the lower member to the support means is oriented to permit pivoting about a substantially horizontal axis.

9. A method of forming flat glass comprising delivering a stream of molten glass onto a pool of molten metal so as to form a ribbon of glass that is passed longitudinally along the pool of molten metal, engaging the top surface of the glass ribbon in a marginal edge portion with an attenuating device that imparts a transverse component of force to the glass ribbon, providing an upward force to the region of the ribbon engaged by the attenuating device by means of a solid member buoyantly contacting the underside of the glass ribbon.

10. The method of claim 9 wherein the member contacting the underside of the glass ribbon is caused to rotate by frictional contact with the glass ribbon.

11. The method of claim 9 wherein the attenuating device acts on the glass ribbon by means of a rotating roll contacting the top glass surface.

12. The method of claim 9 wherein the member contacting the underside of the glass ribbon is comprised of carbon.

13. The method of claim 12 wherein the carbon member is substantially shaped as a disc and rotates about a substantially vertical axis.

14. Apparatus for gripping marginal edge portions of a softened glass sheet comprising: an elongated beam member adapted to be extended into a float glass forming chamber, a roll member rotatably carried at an end of the beam member, drive means for transmitting rotary motion to the roll member, a buoyant member having a specific gravity less than that of molten tin carried by the beam member with freedom to pivot along a path closely adjacent to the roll member.

15. The apparatus of claim 14 wherein the buoyant member is comprised of carbon.

16. The apparatus of claim 14 wherein the buoyant member pivots about an axis substantially transverse to the axis of rotation of the roll member.

* * * * *